May 5, 1959 R. C. FERGASON 2,884,753
MOWER AND LIFT LINKAGE
Filed March 11, 1957 3 Sheets-Sheet 1

Inventor
Rector C. Fergason
by Donald C. McLaughy
Attorney

May 5, 1959   R. C. FERGASON   2,884,753
MOWER AND LIFT LINKAGE
Filed March 11, 1957   3 Sheets-Sheet 2

Inventor
Rector C. Fergason
By Donald C. McDaughey
Attorney

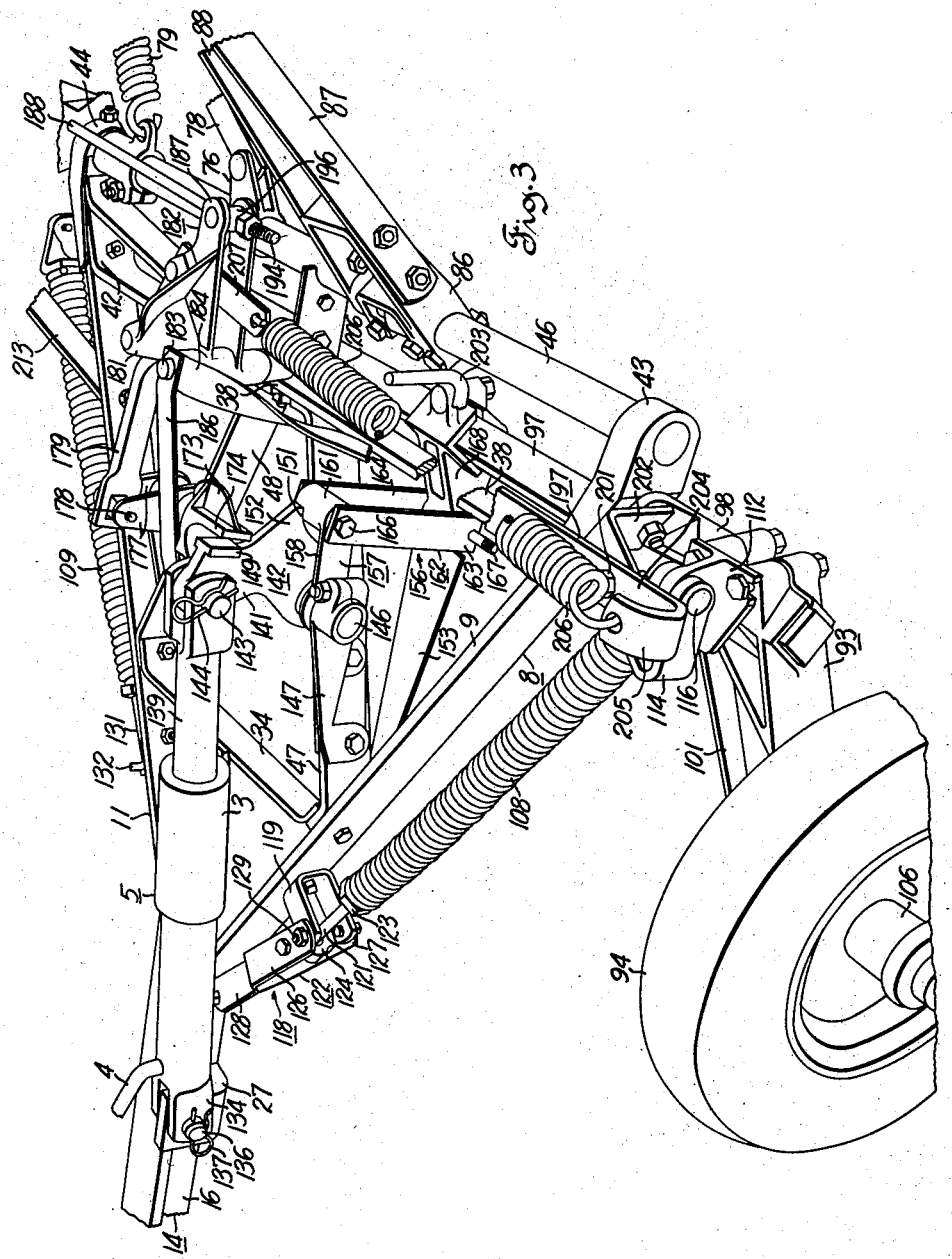

United States Patent Office 2,884,753
Patented May 5, 1959

2,884,753

MOWER AND LIFT LINKAGE

Rector C. Fergason, Gadsden, Ala., assignor to Allis-Chalmers Manufacturing Company, Milwaukee, Wis.

Application March 11, 1957, Serial No. 645,296

8 Claims. (Cl. 56—25)

This invention relates generally to implement attachments for tractors and it is concerned more particularly to mowing implements of the type that are supported by ground engaging wheels and pulled in trailing relation to a tractor.

In trail mowers as heretofore known it has been the general practice to provide a wheel supported main frame and to mount a transversely extending cutter bar supporting sub-frame on the main frame for pivotal movement about a horizontal axis extending generally parallel to the path of tractor travel. In some instances the horizontal axis mounting the subframe is angularly disposed to some extent from a line parallel to the path of travel but it has not been the practice to provide for pivotal movement of the subframe about a pivot axis which is generally transverse to the line of travel. The cutter bar, including an inner ground engaging shoe, is in turn pivotally mounted on the outer grassward end of the subframe for vertical swinging movement relative thereto. The ground following action of the inner shoe is accommodated by vertical up and down floating movement of the outer end of the subframe about its pivotal mounting on the main frame.

During the normal cutting operation the drag or resistance encountered by the inner shoe and cutter bar constantly tends to push the cutter bar and associated subframe rearwardly about the point of pivotal attachment of the subframe to the main frame. It will be appreciated that the provision of a transversely extending subframe further increases the length of the lever arm acted upon by these drag forces. In attempting to effectively counter the drag induced forces it has been the practice to rigidly construct the subframe and in some instances bracing structure is used between the subframe and the main frame of the tractor for further reinforcing. When bracing structure is used it is necessary to provide this structure with suitable pivot mountings so that the floating ability of the subframe is not interfered with.

Trail mowers utilizing the above outlined type of suspension for the cutter bar have not been entirely satisfactory. The bearings mounting the transverse subframe for pivotal movement relative to the main frame on an axis parallel to or at somewhat of an angle to the path of tractor travel are subject to rapid wear and failure due to high radial tension and compression forces thereon which result from the rearward push exerted on the subframe by the drag forces. Bracing structure suggested for reinforcing the subframe to counter these forces has unduly complicated the mower and the pivotal mountings therefore are subject to rapid wear due to the stresses they must absorb. In addition the complex heavy duty bracing and subframe structures materially increase material and fabrication costs.

Generally it is an object of the present invention to provide an improved trail type mower will avoid the shortcomings outlined hereinbefore in a fully satisfactory manner.

More specifically, it is an object of the present invention to provide a mowing implement of the trail type of simplified construction which provides for an improved floating ground following action about a horizontal pivot axis extending transversely of the path of tractor travel.

Another object of the present invention is to provide a trail type mower of the above outlined type in which the inner shoe and associated cutter bar are carried directly by the main frame, and wherein ground following by the inner shoe is accommodated by relative movement between the frame and the ground engaging wheels carried thereby.

Another object of the present invention is to provide a trail type mower in which the main frame is supported by a ground engaging wheel structure yieldingly mounted for vertical swinging movement relative thereto about a pivot axis which extends transversely to the direction of tractor travel.

A further object of the present invention is to provide a mowing implement of the above outlined type having independent frame and cutter bar raising mechanisms operable in response to unidirectional movement of a single power actuated element.

A further object of the invention is to provide frame and cutter bar raising and lowering mechanism for a mower of the above outlined type which will allow swinging movement of the cutter bar to positions above and below horizontal without interference with the frame raising and lowering mechanism or any desired position of vertical adjustment of the frame relative to the ground engaging wheels.

These and other objects and advantages are attained by the present invention, various novel features of which will be apparent from the description herein and from the accompanying drawings disclosing an embodiment of the invention, and will be more particularly pointed out in the claims.

Fig. 3 is a perspective view of the mower shown in Fig. 1 with some parts removed and others broken away and shown in section;

Figs. 4 and 5 are enlarged sectional views taken along the line IV—IV of Fig. 2 showing the mechanism therein in two different positions of adjustment; and Fig. 6 is a rear sectional view taken along the line VI—VI of Fig. 4.

Figure 1:
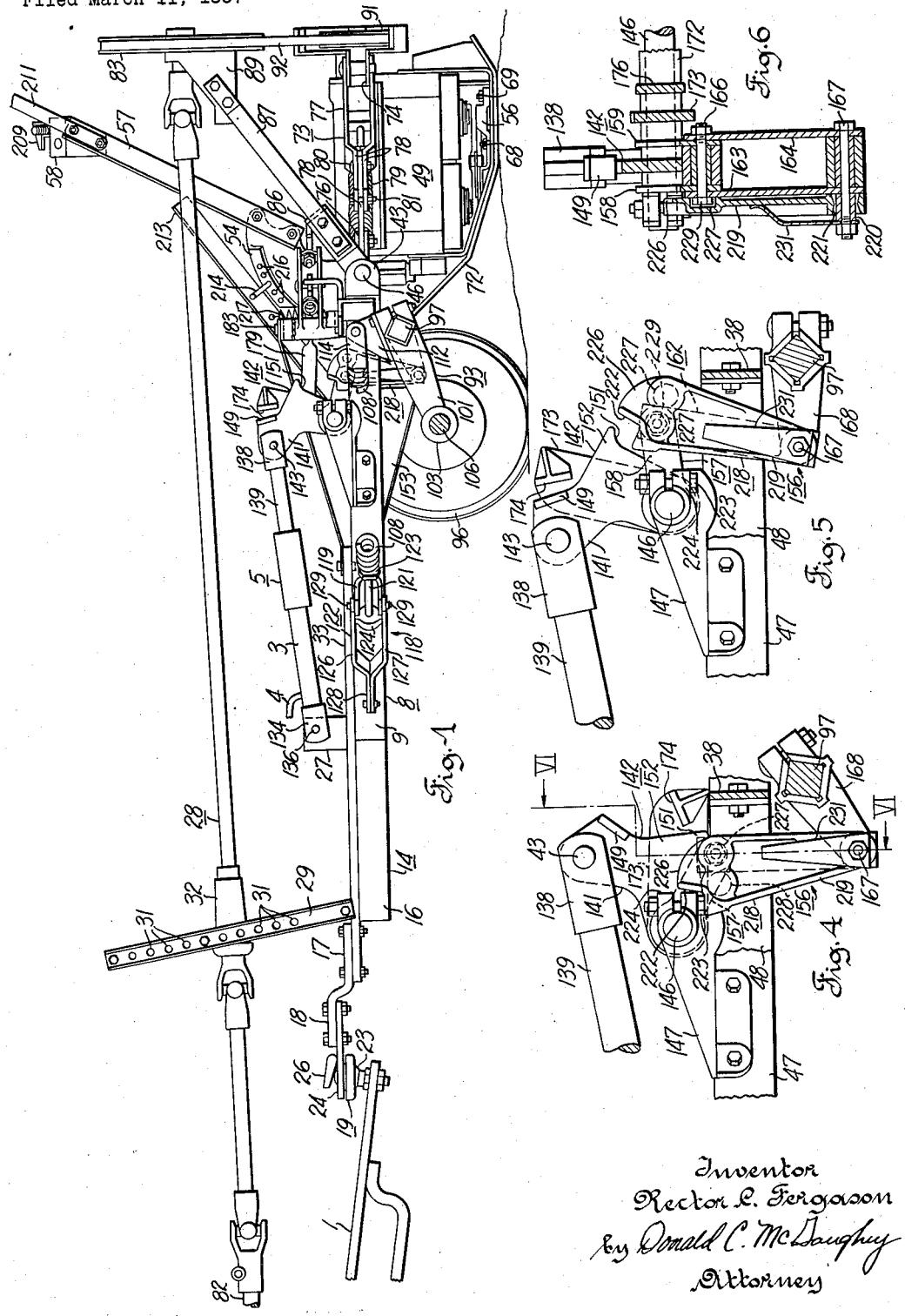
Fig. 1 is a side elevational view with parts broken away of a wheel supported mower attached in trailing relation to a tractor carried drawbar.

Referring to the drawings and particularly Fig. 1, the invention is shown in the combination of a tractor, only the drawbar 1 of which is shown, and a rear trail type implement such as mower 2. It will be understood that the tractor is of conventional construction and is provided with the usual hydraulic system including a hydraulic pump and control means therefor. A conventional remote ram assembly 5 connectable with the tractor hydraulic system is shown in an installed position on the mower in Fig. 3. The remote ram assembly includes a ram 3 and a flexible hydraulic fluid supply hose 4. In accordance with well known practice the hose 4 is connected at its other end to the hydraulic system of the tractor for transmitting hydraulic fluid therethrough to the ram upon actuation of the hydraulic pump. As the tractor and hydraulic system are conventional in construction it is believed that further detailed discussion thereof is unnecessary to understand of the present invention.

Figure 2:
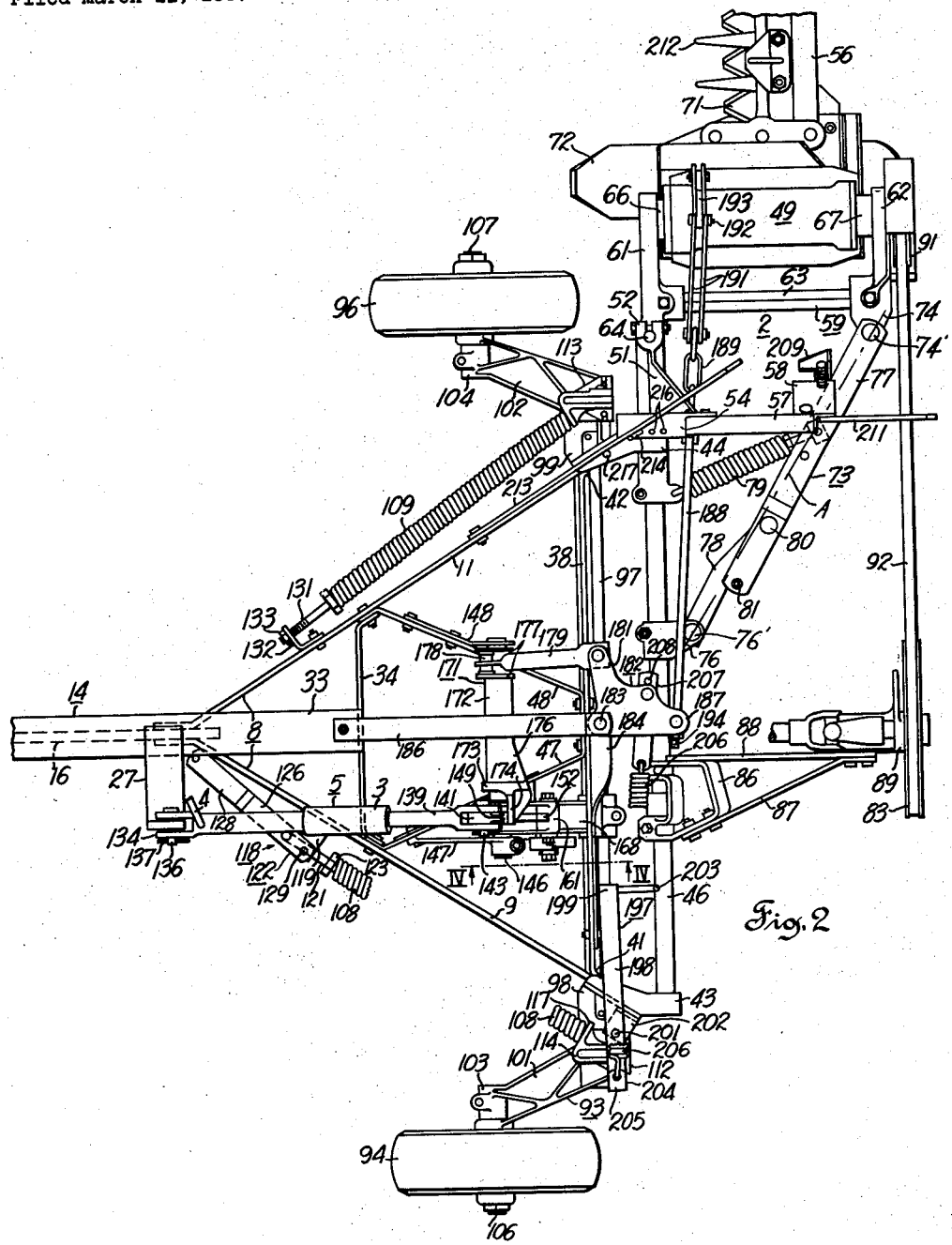
Fig. 2 is a top elevational view of the mower shown in Fig. 1 with some parts broken away and shown in section.

The main frame structure 8 of the mower 2 as best shown in Fig. 2 is of generally triangular shape and includes side portions 9 and 11 which are bolted together at their forward ends to a tongue assembly 14. As best shown in Figs. 1 and 2 the tongue assembly 14 includes a main tongue 16 which extends forwardly of the frame 8. Rigidly attached to the forward end of tongue 16 is a tongue extension 17 having a bight portion 18 adapted to fixedly mount a hitch assembly 19. The hitch assembly 19 is of the ball and socket type and is of conventional construction. The drawbar 2 of the tractor includes a hitch ball 23 which is adapted to receive the socket 24 of the hitch assembly. A suitable toggle lock 26 is provided on the hitch assembly 19 to securely lock the socket 24 on the ball 23.

A remote ram attaching bracket 27 (Figs. 1 and 2) is rigidly secured intermediate the ends of tongue 16 and is adapted to receive the remote ram assembly 5 as will be more fully explained hereinbelow. The tongue 16 also supports power take-off shafting 28 and shield (not shown) through supporting structure which includes a pair of transversely spaced rail members 29, only one of which is shown in Fig. 1. The rail members 29 are mounted on the tongue 16 and as shown in Fig. 1 include a longitudinally spaced series of holes 31 which are adapted to receive mounting bolts carried on the power take-off shaft mounting bracket 32 and shielding structure (not shown). It will be readily apparent that by affixing the mounting bolts in any one of the desired series of holes 31 various height adjustments for the power take-off shaft and shielding may be selected in order that the power take-off shaft can be properly aligned with the power take-off shaft carried by the tractor. The rearward end of the tongue 16 includes a rearwardly extending portion 33 having its free end fixedly mounted on a cross brace 34 which extends between left and right side portions 9 and 11.

The base or rearward portion of the triangular frame 8 is formed by a frame bar 38 which presents bight portions 41 and 42 secured as by bolting to the side portions 9 and 11, respectively. A rear trunnion support 43 is secured as by bolting to the rearward end of bight portion 41 and a similar trunnion support 44 is secured to the rearward end of bight portion 42. Trunnion supports 43 and 44 serve to pivotally support a main frame trunnion shaft 46 which extends parallel to and rearward of the frame bar 38. The triangular frame structure 8 is reinforced by inner triangular brace members 47 and 48 with interconnect frame side portions 9 and 11 with frame bar 38, respectively. The grassward end of the main frame shaft 46, that is, the end on which a cutter bar drive 49 is mounted, extends outward beyond the trunnion 44 and receives a supporting bracket 51 for the cutter bar drive mechanism 49. The supporting bracket 51 is fixedly secured on shaft 46 and includes a vertical pivot shaft mounting hinge 52. The supporting bracket 51 further supports a quadrant section 54 which is utilized for adjusting the amount of tilt of the cutter bar 56 as will be more fully explained hereinbelow. Fixedly mounted on quadrant section 54 as by bolting is a supporting angle 57 which mounts a cutter bar latch mechanism 58 best shown in Figs. 1 and 2. The angle 57 and the associated cutter bar latch mechanism 58 are used to fixedly lock the cutter bar 56 in an elevated position for purposes of transport as will be more fully described hereinbelow.

Referring to Fig. 2 a supporting structure 59 for the cutter bar driving mechanism 49 includes front and rear trunnion supports 61 and 62 rigidly connected by a cross shaft 63. The front truninon support 61 includes a hinge bracket (not shown) which is pivotally mounted on hinge 52 by means of pin 64. The cutter bar driving mechanism 49 is pivotally mounted by trunnions 66 and 67 between trunnion supports 61 and 62 for vertical swinging movement to raised and lowered positions. The cutter bar 56 is fixedly connected as by bolts 68 and 69 (Fig. 1) to the cutter bar drive mechanism 49 and is movable therewith. The cutter bar lift structure which will be more fully described hereinbelow is normally adjusted so that the cutter bar may assume positions from 45 degrees below horizontal to approximately 90 degrees above horizontal. As the cutter bar driving mechanism forms no part of the present invention further detailed description thereof will be omitted, it being sufficient to know that the drive mechanism is operative to reciprocate the knife 71 of the cutter bar 56 in a conventional manner. The inner end of the cutter bar 56 and the associated driving mechanism 49 are supported by an inner ground engaging shoe or runner 72 and the outer end of the cutter bar 56 is supported by an outer ground engaging shoe or runner (not shown) in a manner well known in the art.

The driving mechanism 49 and the associated cutter bar 56 are free to swing rearwardly about the axis of pin 64. The cutter bar is maintained in cutting relation at right angles to the path of tractor travel by a breakback mechanism 73 of conventional construction. The rear trunnion support 62 includes a bracket 74 (Fig. 2) adapted to mount one end of the breakback mechanism 73. A similar mounting bracket 76 is fixedly mounted on the main frame shaft 46. The breakback mechanism is in the form of a spring biased toggle linkage which is interposed in bracing relating between the rear trunnion support 62 and the main frame shaft 46 to hold the cutter bar 56 in right angled relation as shown in Fig. 1. The toggle mechanism includes a long link 77 having one end pivotally connected by pin 74' on bracket 74 and a short link 78 pivotally connected at its opposite ends to bracket 76 by pin 76' and to the other end of link 77 by a pin 80. A coil spring 79 is operatively interconnected between the main frame shaft 46 and toggle link 77. The long link 77 includes a stop element 81 which contacts link 78 to prevent spring 79 from collapsing the links 77 and 78 forwardly to a straight line position. That is, the links 77 and 78 are not in an exact straight line relation as the stop 81 maintains pin 80 somewhat rearwardly of center line A drawn between pins 74' and 76'. Thus it will be apparent that links 77 and 78 are always jackknifed rearwardly a slight amount and during normal operation the tension of spring 79 is sufficient to maintain the members 77 and 78 in slightly off center line relation to each other as shown in Fig. 1. However, should the cutter bar 56 encounter an obstruction of some sort the cutter bar 56 and drive mechanism 49 will tend to pivot rearward about pin 64 and when this pivot force is sufficient to overcome the tension of spring 79 the links 77 and 78 will jackknife relative to each other moving pin 80 in a rearward direction, that is, to the right in Fig. 2, to allow the cutter bar to swing rearwardly about its mounting on the pivot shaft 64. In order to reengage the breakback mechanism, the operator simply backs up the tractor so that the cutter bar 56 will again assume the right angle position. When this is done the tension of the spring 79 again becomes effective to hold the link members 77 and 78 in the slightly jackknifed relationship to each other.

The power train for operating the cutter bar driving mechanism 49 is best seen in Fig. 1 and includes power take-off shafting 28 operatively connecting the tractor power take-off shaft 82 with a driving sheave 83. The driving sheave 83 is carried by a supporting structure which includes a bracket 86 fixedly mounted on the frame shaft 46 as by bolting. A pair of upper sheave support braces 87 and 88 (Fig. 2) are fixedly mounted on the support bracket 86. A bearing housing 89 is bolted to the upper end of the support braces 87 and 88 and rotatably supports the rearward end of the power take-off shafting 28. The driving sheave 83 is fixedly attached to the projecting rearward end of the power take-off shafting 28. A lower driven sheave 91, rotatably mounted on the cutter bar driving mechanism 49, is driven by a V-belt 92 which is operatively trained about the sheaves 83 and 91. Actuation of the tractor power take-off shaft 82 drives the upper sheave 83 and this through belt 92 drives the lower sheave 91 to operate the cutter bar driving mechanism.

The mower frame above described is carried by a ground engaging wheel structure 93 (Figs. 1, 2 and 3) including a pair of wheels 94 and 96 which are mounted on the frame 8 for up and down movement relative thereto. The wheel structure further includes an axle 97 extending transversely of frame 8 which is rotatably mounted in brackets 98 and 99 fixedly attached as by bolting to rear trunnion supports 43 and 44, respectively. A crank arm 101 is fixedly mounted on one end of the axle 97 and a similar crank arm 102 is fixedly mounted to the other end of axle 97. The free ends 103 and 104 of crank arms 101 and 102, respectively, fixedly mount stub axles 106 and 107 upon which the ground engaging wheels 94 and 96 are rotatably mounted. Referring particularly to Fig. 2 it will be seen that the crank arms 101 and 102 are mounted on longitudinally spaced portions of the axle 97 in radially extending relation thereto. As shown in Fig. 3 the ground engaging wheel 94 is mounted on crank arm 101 for rotation relative thereto about an axis 106 which is radially offset from the pivot axis of the axle 97.

Resilient means in the form of counterbalance springs 108 and 109 are operatively interposed between the frame 8 and the wheel structure 93 so as to yieldingly resist upward movement of the latter relative to the frame 8. The mounting structure for spring 108, as shown in Figs. 1 and 3, includes a lever arm bracket 112 which is fixedly attached to crank arm 101 as by bolting. The bracket is provided with a mounting aperture that is radially offset from the axis of axle 97 and circumferentially spaced from the radially extending crank arm 101. A U-shaped bracket 114 is mounted on bracket 112 by a pin 116 and provides a flange 117 which mounts one end of counterbalance spring 108. The forward end of counterbalance spring 108 is secured to side frame portion 9 by means of an overcenter toggle mechanism 118. Referring to Fig. 3 the toggle mechanism includes a U-shaped mounting bracket 119 fixedly secured to side frame portion 9 as by bolting. The distance between the legs of the U-shaped bracket 119 is such that a counterbalance spring mounting stud 121 will pass freely therebetween. The stud 121 is threaded into an adjusting nut 123 rotatably carried by the forward end of spring 108. The outer ends of the legs of bracket 119 mount the free ends of a Y-shaped toggle arm 122 for pivotal movement relative thereto about an axis 129. The forward end of the mounting stud 121 presents a collar member 124 provided with stub shafts which are rotatably mounted between the legs 126 and 127 of the Y-shaped member 122 intermediate its point of attachment on the U-shaped bracket 119 and its free end or handle 128. As best shown in Fig. 2 pivotal movement of the handle member 128 toward frame member 9 will tension spring 108. Pivotal movement is continued until the handle 128 rests against the frame member 9 and in this position the line of action of spring 108 has passed over the pivot center 129 presented by the point of attachment of toggle arm 122 on the U-shaped bracket 119 and the tension of spring 108 serves to lock the handle 128 against the frame. When it is desired to release the tension of spring 108 the handle 128 is pulled outwardly away from frame 9 thereby passing the line of action of spring 108 over pivot center 129. The handle is then swung rearwardly to completely relax the tension on the spring. The overcenter toggle mechanism is effective to relax the tension of counterbalance spring 108 for the purposes of presenting the hitch assembly 19 at the proper vertical height for attachment to the tractor drawbar as will be more fully explained hereinbelow.

The other counterbalance spring 109 has one of its ends mounted on a lever arm bracket 113 similar in construction to bracket 112. The other end of spring 109 is provided with a threaded mounting stud 131 which is passed through a suitable aperture in bracket 132 carried by frame side portion 11. The tension of springs 108 and 109 may be adjusted by tightening or loosening the adjusting nuts 123 and 133 which secure the studs 121 and 131, respectively, in place. From the foregoing it will be appreciated that the springs 108 and 109 are under tension and bias the crank arms downwardly in a frame raising direction. The weight of the mower 2 is substantially carried by these counterbalance springs. Substantially no weight is carried by the drawbar as the longitudinal center of balance of the mower, as seen in Fig. 1, is behind the wheels 94 and 96. However, a small amount of the mower weight is carried by the inner ground engaging shoe 72 of the cutter bar. The amount of weight carried by the inner shoe 72 is very small as it is desired that the cutter bar have only a light positive ground following action. In actual practice the tension of the springs 108 and 109 is adjusted so that a light vertical force on the inner shoe 72 is sufficient to cause the frame 8 to raise relative to the wheels 94 and 96.

The mower frame 8 is provided with suitable cutter bar and frame lift mechanisms operable in response to unidirectional movement of a single actuating means in the form of ram 3. The ram 3 has a bifurcated end 134 which is removably mounted in straddling relation to bracket 27. The end 134 and bracket 27 are provided with suitable apertures for receiving a hitch pin 136. Accidental displacement of pin 136 is prevented by cotter pin 137. The rearward end of the ram piston 139 is provided with a similar bifurcated bracket 138 mounted by pin 143 in straddling relation on one arm 141 of a double armed rocker 142. When it is desired to remove the remote ram 3 it is only necessary to pull the cotter pins 137 and 144 and remove the pins 136 and 143. Referring to Fig. 2 a shaft 146 is fixedly mounted between triangular braces 47 and 48 through the provisions of bracket members 147 and 148. The double armed rocker 142 is pivotally mounted on shaft 146 for back and forth movement and is provided with a first stop portion 149 on arm 141 and a second stop portion 151 on the other arm 152 thereof. It will be noted from Figs. 2 and 3 that the first and second stop portions 149 and 151 are radially offset from the pivot center of the rocker 142 on shaft 146 and that they are circumferentially spaced from each other. From the foregoing description it will be readily apparent that the extension and contraction of ram 3 will result in back and forth pivotal movement of rocker arm 142.

Thrust transmitting means 156 (Fig. 3) are operatively interposed between the frame 8 and the wheel structure 93 for adjusting the latter downwardly relative to the frame 8. The thrust transmitting means 156 include a frame lift lever 157 comprising a pair of spaced straps 158 and 159 each pivotally mounted at one end thereof on fixed shaft 146 and connected at their other or outer ends to a cylindrical stop 161 adapted to coact with the second stop portion 151 carried by the rocker 142. A thrust transmitting link 162, comprising a pair of thrust members 163 and 164, is pivotally secured at one end as by bolt 166 to the cylindrical stop 161. The lower ends of the thrust members 163 and 164 are pivotally connected by a bolt 167 to a lever arm 168 fixedly mounted on the axle shaft 97. Rearward movement of rocker 142 will result in rearward and downward movement of second stop portion 151 until it contacts cylindrical stop 161. Continued movement of rocker 142 depresses frame lift arm 157 and the associated thrust members 163 and 164 to thereby push lever arm 168 downward. Downward movement of the lever arm 168 results in counterclockwise movement of shaft 97 as viewed in Figs. 1 and 3 thereby depressing crank arms 101 and 102 in frame raising direction. A shield 153 is fixedly mounted on brace 47 and depends therefrom for the purpose of deflecting grass vines and the like and avoid clogging of the rocker 142 and frame lift linkage 156.

The mower frame is additionally provided with lift force transmitting means 171 operative to raise the cutter bar 56 about its pivotal mounting in trunnion supports 61, 62. The lift means includes a sleeve 172 (Figs. 2 and 6) rotatably mounted on the shaft 146. A cutter bar lift arm 173 is fixedly attached in radially extending relation ot sleeve 172 and is provided with a transversely offset contact portion 174 positioned to be engaged by the first stop portion 149 on rocker 142. The sleeve 172 is additionally provided wtih an integral brace 176 (Figs. 2 and 6) which laterally reinforces the arm 173. A radially extending push rod lever arm 177 is fixedly attached to the sleeve 172 in axially spaced relation to arm 173. The free end of lever arm 177 is apertured for pin 178 which mounts one end of a push bar 179. The other end of push bar 179 is pivotally mounted on one arm 181 of a bell crank 182. As best shown in Fig. 3 the bell crank 182 is mounted for pivotal movement about a pivot shaft 183 fixedly carried by the rear frame bar 38. Suitable bracing straps 184 and 186 are provided for the bell crank pivot shaft 183. The other arm 187 of the bell crank 182 is connected with the pivotally mounted cutter bar drive 49 (Fig. 2) by means of rod 188, chain 189 and bracket 191. The hinge bracket 191 is pivotally connected by pin 192 to a bar lift strap 193 which is pivotally carried by cutter bar drive 49. As shown in Fig. 3 end 194 of rod 188 as a threaded portion which passes through an apertured trunnion 196 carried by bell crank arm 187 and is secured therein by a nut. It will be appreciated that the effective length of rod 188 can be varied by turning the nut to the desired position. In operation rearward movement of rocker 142 will be transmitted through the lift and push rod arms 173 and 177, respectively, to the push bar 179. Rearward movement of push bar 179 will pivot bell crank 182 clockwise as viewed in Figs. 2 and 3 thereby exerting tension on the rod 188. Tensioning of rod 188 results in upward swinging movement of the cutter bar drive mechanism 49 and cutter bar 56 about the axis of trunnions 66 and 67.

A cutter bar counterbalancing mechanism 197 is operatively interposed between the frame 8 and the bell crank 182 to aid in upward swinging movement of the cutter bar. Referring to Figs. 2 and 3 an overcenter lever arm 198 is pivotally mounted at 201 on a bracket 202 carried by rear trunnion 43. The end 199 of the overcenter lever arm 198 remote from pivot 201 is provided with a handle 203. The other end 204 of the lever arm 198 opposite the handle 203 is curved upwardly and affords a spring attaching bracket 205. A counterbalance spring 206 is connected between bracket 205 and a mounting strap 207 carried by bell crank 182. The mounting strap 207 is provided with a spaced series of holes 208 (Fig. 2) and the tension of spring 206 may be simply varied by changing the position of strap 207 on the bell crank 182 within the limits defined by the series of holes 208. In Fig. 2 the counterbalance spring 206 is shown in a condition of tension and in this position the handle 203 has been pushed forwardly until the end 199 of lever arm 198 abuts the brace 184. In this position the other or spring mounting end 205 of the lever arm 198 has moved rearwardly a sufficient distance so that the line of action of spring 206 is rearward of the pivot center 201 as seen in Fig. 2. When the line of action of spring 206 has passed rearwardly of the pivot 201 the tension of spring 206 automatically locks the lever 198 against the brace 184, thus keeping cutter bar raising tension on the bell crank 182. When it is desired to release the tension of counterbalance spring 206 it is only necessary to pull the handle 203 rearwardly thus passing the line of action of spring 206 back past the pivot center 201 and then allowing the lever 198 to swing rearwardly a sufficient distance to relax the spring.

It will be appreciated that the mower frame provides extensible and contractible actuating means in the form of ram 3 for moving the rocker 142 into contact with lift force transmitting means 171 to raise the cutter bar and with thrust transmitting means 156 to rotate the axle structure 97 and depress the crank arms 101 and 102 to raise the frame and cutter bar drive 49. As relative movement between the mower frame 8 and the inner shoe 72 and associated drive mechanism 49 mounted thereon is not possible, all floating action of the inner shoe is necessarily accommodated by movement of the frame and inner shoe relative to the ground engaging wheels on an axis transverse to the line of tractor travel. In other words the ground engaging wheels are free to float up and down in opposition to the resilient action of the counterbalancing springs in order to provide for ground following action of the cutter bar. In addition the outer end of the cutter bar is free to float up or down about trunnions mounting the cutter bar drive 49. These floating actions are necessary so that the cutter bar does not plow through uneven ground and damage or clog the cutter bar and shoe.

A transport position (not shown) is provided for the cutter bar 56 when it is necessary to move the mower along the highways or between fields. In the transport position the cutter bar 56 is pivoted about trunnion support brackets 61 and 62 past a vertical position and then lowered across the mower frame 8 until the cutter bar 56 rests upon a latch bracket 58 carried by angle iron 57 (Fig. 1). The bracket 58 pivotally mounts a spring biased latch 209 which hooks over the cutter bar to lock it in the transport position.

The angle 57 also serves as a cutter bar tilt control lever. As described hereinbefore a cutter bar drive support bracket 51 is fixedly secured on the pivot shaft 46, to permit rocking of the cutter bar drive 49 and cutter bar 56 about the axis of shaft 46. A tilt lever handle 211 is secured to angle 57 and clockwise rocking of the lever 211 and angle 57 as viewed in Fig. 1 will pivot the cutter bar drive 49 and cutter bar 56 about the horizontal axis of shaft 46 to thereby raise the forward edge of the cutter bar 212 (Fig. 2) and obtain a higher level of cut. Counterclockwise rocking of lever handle 211 will move the forward edge 212 closer to the ground and result in a closer cut. The desired tilt setting is maintained by locking brace 213 which has its forward end pivotally secured to side frame portion 11. The brace 213 is provided with a locking pin 214 which is insertable in any one of a series of holes 216 presented by the quadrant section 54 to thereby prevent movement of the cutter bar 56 from a desired tilt setting. The brace 213 and pin 214 are maintained in locking relation with the quadrant 54 by the action of spring 217 which extends from an intermediate point on brace 213 to trunnion portion 44. To change the amount of tilt the brace 213 need only to be raised until pin 214 disengages the quadrant 54. The cutter bar 56 is then tilted by moving handle 211 in the desired direction. When the desired tilt position is reached, the brace 213 is again lowered engaging the pin 214 in a suitable hole presented by the quadrant section.

During normal usage of the mower it is frequently desired to transport the mower to various areas of work without using the tractor for purposes of transport. It will be understood that under such circumstances no ram will be available for depressing the wheels 94 and 96 to their fullest extent and maintaining them in that position so that the frame 8 has sufficient road clearance.

The absence of a ram makes it somewhat difficult to tow the mower behind a vehicle such as a conventional pickup truck as the floating action of the frame is too responsive for higher speed road travel. Accordingly provisions have been made which enables the operator to lock the frame carrying wheels in a fully depressed position. This results in the maximum clearance between the frame and ground thereby permitting the mower to be pulled in the manner of a conventional trailer by any vehicle equipped with a conventional ball hitch. This mechanism termed a "transport lock" is generally indicated by the reference character 218 and is best shown in Figs. 4, 5 and 6. The transport lock includes a strut 219 of lesser transverse width at one end thereof than at the other. The narrower end has a mounting aperture 221. The extension of pivot pin 167 carried by the axle structure lever arm mounts a bushing 220 of a diameter to loosely receive aperture 221 as shown in Fig. 6. The aperture 221 is hourglass shaped in section so that both pivotal and longitudinal rocking movement of the strut relative to axis of mounting bolt 167 are possible. The upper end 226 of the strut 219 is provided with a right angle saddle or seat 222 which is adapted to be placed under the head of bolt 223 carried by flange 224. The upper end of strut 219 adjacent to seat 222 is provided with two transversely spaced depressions 227 and 228 which are each of a diameter sufficient to receive the head 229 of bolt 166 (Fig. 6). The strut 219 is movable to two positions with either depression 227 or 228 surrounding bolt head 229. The strut 219 is held in either of these positions by resilient means in the form of a leaf spring 231 which urges the strut into abutting relation to strap 163. Referring to Fig. 4 it will be noted that the strut 219 is in a first position with the saddle 222 fit under the head of bolt 223. The strut is now in bracing relation between the frame structure 8 and the wheel structure 93. In this position the head 229 is engaged by the first depression 227 and any tendency of the strut 219 to pivot to the position shown in Fig. 5 is prevented by contact of the sides of the depression 227 with the bolt head 229. When it is desired to release the strut 219 and move it to the second inoperative position shown in Fig. 5 the strut is pulled laterally against the bias of leaf spring 231 in order that the depression 227 becomes disengaged from the bolt head 229. The strut then is pivoted rearwardly until the second depression 228 is in alignment with bolt head 229. The strut is then released and the action of leaf spring 231 urges the strut into abutting relation with strap 163 with the depression 228 surrounding bolt head 229.

The mowing attachment is shown in Fig. 1 in an operative position wherein the crank arms and wheels 94 and 96 are free to float up or down in response to ground conditions encountered.

Referring to Fig. 2 it will be noted that the wheel 96 precedes the inner shoe 72 and serves a gaging function. If, for example, a rise in the ground is encountered the wheels will raise slightly relative to the frame 8 under the impetus of the encounter. This action will pivot lever arm brackets 112 and 113 rearwardly and thereby increase the tension of springs 108 and 109 slightly to absorb the shock. After the encounter the springs contract to depress or return the wheels to their normal position. This raises the frame and enables the associated inner shoe to ride easily over the rise. The resiliency of the springs absorbs the shocks to minimize bouncing and provide a more even cut.

During operation there is no pressure on ram 3. As floating action of the wheels occurs the axle lever arm 168 and associated link 162 will swing up and down and possibly contact stop portion 151 of rocker 142. Should this occur the rocker 142 will be pivoted forwardly and further collapse piston 139 into the ram cylinder. As the stop 174 of cutter bar lift lever 173 is rearward of the rocker 142 independent of the frame lift lever 157 it will be apparent that forward movement of the rocker due to floating of the wheels will not affect the elevation of the outer end of the cutter bar 56.

The cutter bar is free, at all times to float to positions above and below horizontal about the axis of trunnions 66 and 67. When the outer end of the cutter bar raises, the spring 206 contracts thereby pivoting bell crank 182 and moving push bar 179 rearward. This pulls lift lever 173 rearwardly away from the rocker 142. As the sleeve 172 mounting cutter bar lift lever 173 is independent from frame lift lever 157 rotation thereof does not affect the position of the frame 8 relative to the wheels 94 and 96. When the outer end of the cutter bar lowers, it tensions spring 206 and moves push bar 179 forwardly. This in turn moves lever 173 and stop 174 forwardly. If the ram 3 is not contracted sufficiently contact between stop 174 and rocker stop 149 will occur. As the ram is not under pressure such contact only results in a further collapsing of the ram 3.

When it is desired to raise the frame 8 and cutter bar 56 the operator actuates the ram 3 which extends to pivot rocker 142 rearward. As shown in Figs. 3 and 5 the rocker stops 149 and 151 are uniformly spaced from the cutter bar lift lever contact 174 and cylindrical stop 161 of the frame lift lever 157 when the cutter bar 56 is in a normal horizontal moving position. It will be appreciated that the frame and cutter bar raising is substantially simultaneous as the lever arms will be actuated at the same time. As the frame lever 157 is depressed the wheel structure moves downward thereby raising the frame as the outer end of the cutter is being elevated. In actual practice the frame and cutter bar raising linkages are adjusted so that when the inner shoe has raised to approximately four inches off the ground the cutter bar is still in a horizontal position. As the inner shoe 72 raises further the outer end of the cutter bar 56 also raises. If desired the rod 188, in the cutter bar raising linkage, can be shortened thereby causing an earlier raising of the outer end of the cutter bar 56. Sufficient shortening of linkages 188, 189, 191 would provide sequential lifting, that is, raising of the outer end of the cutter bar 56 prior to any raising movement of the inner shoe.

To detach the mower the ram 3 is actuated to raise the frame 8 and reduce the tension on spring 108. The toggle release mechanism is then moved overcenter to relax spring 108. Spring 109 is left tensioned. The cutter bar is then manually raised from its elevated position to the transport position on latch bracket 58 and locked by latch 209. The pressure on ram 3 is then released to lower the frame and the ball latch and power take-off train is detached. The ram is then removed or hose 4 detached from the tractor.

By completely relaxing one of the springs half of the biasing force on the crank arms 101 and 102 is removed. This permits the forward part of the frame to settle lower relative to the wheels 94 and 96 and present the hitch assembly 19 at the proper drawbar height. If both springs 108 and 109 were left tensioned the frame would ride higher relative to the wheels, and as the center of gravity of the frame is located behind the wheels, the hitch assembly 19 would be positioned too high relative to the drawbar 1.

If the mower is not going to be transported it is not necessary to engage the transport lock 218 and it may be left in the remote nonengaging second position shown in Fig. 5. If, however, it is necessary to transport the mower by means other than the tractor the strut 219 is pivoted to a first position in engagement under bolt head 223 as shown in Fig. 4 when the frame is in a raised position. The ram 3 may then be removed. Relative movement between the frame and wheel structures is then prevented.

In general terms, the herein disclosed mower comprises a frame which in the illustrated embodiment of the invention includes the side portions 9, 11, rear frame bar 38 and braces 34, 47 and 48. Crank means, as represented by the crank arms 101 and 102, on terminal portions of the axle 97 have ground engaging means in the form of wheels 94, 96 on their outer ends, and resilient torque applying means, as represented by the springs 108 and 109 are arranged between the frame and the axle to maintain the frame in floating relation with respect to the ground as illustrated by Fig. 1. The frame is positively raised from its floating position by power operated, freely separable and retractable torque applying means between the frame and the axle. In the illustrated embodiment of the invention such means are represented by the rocker 142 and stop 161 through which lifting power is transmitted to the frame by operation of the ram assembly 5 when they are in engagement with each other and which are freely separable and retractable as illustrated by Fig. 5.

It should be understood that it is not intended to limit the invention to the herein disclosed forms and details of construction and that the invention includes such other forms and modifications as are embraced by the scope of the appended claims.

What is claimed is:

1. In a mowing attachment of the type adapted to be attached in trailing relation to a tractor, the combination of a frame, an axle pivoally mounted on said frame to extend transversely thereof, a lever arm mounted on said axle, crank arms mounted on longitudinally spaced portions of said axle in radially extending relation thereto, a ground engaging wheel mounted on each of said crank arms for rotation relative thereto about an axis radially offset from the pivot axis of said axle, resilient means operatively interposed between said frame and said crank arms so as to yieldingly resist upward movement of the latter relative to said frame, extensible and contractible actuating means mounted on said frame, thrust transmitting means carried by said frame and operatively interposed between said actuating means and said lever arm for pivoting said axle and adjusting said wheels downwardly, a cutter bar, and means adjustably mounting said cutter bar on said frame for movement to raised and lowered positions.

2. In a mower the combination of a frame; an axle pivotally mounted on said frame and including a radially extending lever arm mounted thereon; crank arms mounted on longitudinally spaced portions of said axle in radially extending relation thereto; a ground engaging wheel mounted on each of said crank arms for rotation relative thereto about an axis radially offset from the pivot axis of said axle; resilient means operatively interposed between said frame and said axle so as to yieldingly resist upward movement of said wheels relative to said frame; a cutter bar mounted on said frame for swinging movement to raised and lowered positions about an axis extending in the direction of tractor travel; a rocker mounted on said frame and having radially offset circumferentially spaced first and second stop portions; extensible and contractible actuating means interposed between said frame and said rocker for pivoting the latter; a cutter bar lift lever pivotally mounted on said frame and contacted by said first stop portion; lift force transmitting means operatively interposed between said lift lever and cutter bar for pivoting the latter about said longitudinal axis in response to pivotal movement of said rocker; a frame lift lever pivotally mounted on said frame and contacted by said second stop portion; and a link pivotally connected at its opposite ends respectively to said frame lift lever and to said axle lever arm for pivoting said axle and adjusting said wheels downwardly in response to pivotal movement of said rocker.

3. In a mower the combination of a frame structure, a ground engaging wheel structure mounted on said frame structure for up and down movement relative thereto, resilient means operatively interposed between said frame structure and said wheel structure so as to yieldingly resist upward movement of the latter relative to said frame structure, a cutter bar, means adjustably mounting said cutter bar on said frame structure for movement to raised and lowered positions, means operatively interposed between said frame structure and said wheel structure for adjusting the latter downwardly relative to said frame structure, and stop means mounted on one of said structures and selectively positionable between the latter and the other of said structures for preventing movement of said frame structure relative to said wheel structure when the latter is in a predetermined position of downward adjustment.

4. The combination recited in claim 3 wherein said stop means comprises a strut pivotally mounted at one of its ends on one of said structures, the other end of said strut being selectively movable to a first position in bracing engagement with the other of said structures to prevent relative movement between said wheel and frame structures, and to a second remote nonengaging position affording relative movement between said frame and wheel structures, and resilient means operatively interposed between one of said structures and said strut for maintaining the latter in said first and second positions.

5. In a mowing attachment of the type adapted to be attached in trailing relation to a tractor; the combination of a frame; an axle pivotally mounted on said frame to extend transversely thereof; a lever arm mounted on said axle; crank arms mounted on longitudinally spaced portions of said axle in radially extending relation thereto; a ground engaging wheel mounted on each of said crank arms for rotation relative thereto about an axis radially offset from the pivot axis of said axle; resilient means operatively interposed between said frame and said crank arms so as to yieldingly resist upward movement of the latter relative to said frame; a cutter bar; means adjustably mounting said cutter bar on said frame for movement to raised and lowered positions; a double armed rocker pivotally mounted on said frame; actuating means operatively interposed between said frame and one arm of said rocker; a thrust transmitting link pivotally mounted at one of its ends on said axle lever arm, the other end of said link operatively connected with the other arm of said rocker so that pivotal movement of the latter will adjust said wheel supporting crank arms downwardly; and a strut pivotally mounted at one of its ends on said axle lever arm, and selectively positionable between the latter and said frame for preventing movement of the latter relative to said wheel supporting crank arms.

6. In a mower the combination of a frame; an axle pivotally mounted to extend transversely of said frame and including a radially extending lever arm and a pair of laterally spaced radially extending crank arms; a ground engaging wheel mounted on each of crank arms for rotation relative thereto about an axis radially offset from the pivot axis of said axle; a counterbalance spring operatively interposed between said frame and each of said crank arms so as to yieldingly resist upward movement of said wheels relative to said frame; a cutter bar mounted on said frame for swinging movement to raised and lowered positions; a rocker mounted on said frame and having radially offset circumferentially spaced first and second stop portions; extensible and contractible actuating means interposed between said frame and said rocker for pivoting the latter; a cutter bar lift lever pivotally mounted on said frame and contacted by said first stop portion; lift force transmitting means operatively interposed between said lift lever and cutter bar for pivoting the latter to raised and lowered positions in response to pivotal movement of said rocker; a frame lift lever pivotally mounted on said frame and contacted by said second stop portion; a link pivotally connected at its opposite ends respectively to said frame lift lever and to said axle lever arm for pivoting said axle and adjusting said wheels downwardly in response to pivotal movement of said rocker; a strut pivotally mounted on said axle lever arm and selectively movable to a first position in bracing engagement with said frame and to a second nonbracing position relative to said frame; and means mounted on said lever arm for maintaining said strut in said first and second positions.

7. In a mowing attachment of the type adapted to be attached in trailing relation to a tractor, the combination of a frame; a ground engaging wheel structure swingably mounted on said frame for up and down movement relative thereto; resilient means operatively interposed between said frame and said wheel structure so as to yieldingly resist upward movement of the latter relative to said frame; a cutter bar; means adjustably mounting said cutter bar on said frame for movement to raised and lowered positions; a lever arm mounted on said wheel structure, a double armed rocker pivotally mounted on said frame, actuating means operatively interposed between said frame and one arm of said rocker, and link means operatively interposed between the other arm of said rocker and said lever arm so that movement of said rocker will adjust said lever arm and swing said associated wheel structure downwardly relative to said frame.

8. In a mower, the combination of a frame, an axle pivotally mounted on said frame, crank means on terminal portions of said axle having ground engaging means on their outer ends, a cutter bar on said frame, resilient torque applying means between said frame and said axle to maintain said frame in floating relation with respect to the ground, and power operated, freely separable and retractable, torque applying means between said frame and said axle to positively raise said frame with respect to the ground.

References Cited in the file of this patent

UNITED STATES PATENTS

| | | |
|---|---|---|
| 2,463,726 | Synck et al. | Mar. 8, 1949 |
| 2,520,107 | Vutz | Aug. 22, 1950 |
| 2,520,743 | Tanke | Aug. 29, 1950 |
| 2,592,991 | Yeager et al. | Apr. 15, 1952 |
| 2,649,678 | Sishc | Aug. 25, 1953 |
| 2,816,410 | Nobles | Dec. 17, 1957 |